United States Patent [19]

Hagy et al.

[11] Patent Number: 4,676,460
[45] Date of Patent: Jun. 30, 1987

[54] LONGITUDINAL STABILITY AUGMENTATION SYSTEM AND METHOD

[75] Inventors: Howard K. Hagy; Thomas A. Harrington, both of Renton, Wash.

[73] Assignee: The Boeing Company, Seattle, Wash.

[21] Appl. No.: 675,713

[22] Filed: Nov. 28, 1984

[51] Int. Cl.⁴ .............................................. B64C 13/16
[52] U.S. Cl. .................... 244/76 R; 244/178; 364/432
[58] Field of Search ............... 244/76 R, 76 C, 177, 244/178, 175, 180, 182, 186, 191, 194; 364/432

[56] References Cited

U.S. PATENT DOCUMENTS

| | | | |
|---|---|---|---|
| 2,516,142 | 7/1950 | Nissen | 244/76 R |
| 2,753,134 | 7/1956 | Gordon et al. | 244/76 R |
| 2,967,680 | 1/1961 | Meyers et al. | 244/178 |
| 3,002,714 | 10/1961 | Decker | 244/178 |
| 4,442,490 | 4/1984 | Ross | 244/180 |

Primary Examiner—Trygve M. Blix
Assistant Examiner—Rodney Corl
Attorney, Agent, or Firm—Delbert J. Barnard; Bruce A. Kaser

[57] ABSTRACT

The control system includes a schedule (54) which plots airspeed versus stabilizer angle for a trim condition. Following a pilot adjustment of the stabilizer angle to establish trim, the schedule (54) plots the trim airspeed to obtain a stabilizer angle value. A change in airspeed from trim is sensed by a sensor (52) and the schedule (54) plots the new airspeed on the same graph to obtain a new stabilizer angle value. The schedule (54) determines a change in stabilizer angle signal in the form of increments of movement of the stabilizer control actuator (28) to return the stabilizer (18) to a trim condition. A schedule (40) in the system also senses any change in the rate of change of altitude from trim and computes from this change a second signal in the form of increments of actuator movement. There is an algebraic summation of these two signals and a stabilizer angle feedback signal to produce a command signal. The system includes cutoff schedules (66, 68) which transmits the command signal on to the actuator (28) only during the high thrust, aft center of gravity region of the flight envelope. The change in rate of change of altitude feedback path senses an impending change in speed and in response thereto starts a change in direction of stabilizer movement, so that the stabilizer will be moving in the right direction when the change in speed signal becomes operative.

18 Claims, 9 Drawing Figures

LONGITUDINAL STABILITY AUGMENTATION SYSTEM AND METHOD

TECHNICAL FIELD

This invention relates to flight control of aircraft. More particularly it relates to the provision of a system and a method for inputting an incremental horizontal stabilizer angular position change that is a function of both a change in airspeed from trim and a change in the rate of change of altitute from trim, to benefit both the static longitudinal and phugoid stability characteristics of the aircraft.

BACKGROUND ART

An aircraft is in trim when the vector sum of the forces and moments about its center of gravity is zero. The "y" axis of an aircraft extends laterally out of the aircraft through the center of gravity. The moments acting about this axis are termed the "pitching" moments. In general, the wing generated forces tend to rotate the nose of the aircraft downwardly and the horizontal stabilizer generated forces tend to rotate the nose of the aircraft upwardly. Aerodynamic forces acting on the fuselage also provide a pitching moment input. In an aircraft of a type having engine thrust vectors located below the center-of-gravity, the thrust of the engines tends to rotate the nose of the aircraft upwardly. Any change in position of the flaps at the trailing edges of the wings, or the angle of the stabilizer, or the angle of the elevators at the trailing edges of the stabilizer, or the thrust level of the engines, or the position of the center of gravity of the aircraft will make a change in the net pitching moment.

An aircraft is in trim in the longitudinal direction if the vector sum of the moments about the "y" axis of the aircraft is zero. The forces produced by the wing and stabilizer surfaces are a function of airspeed. The pitching moment input of the fuselage is also a function of airspeed. If an aircraft is in trim and then experiences a change in airspeed, caused by a gust, for example, this will result in a change in the aerodynamic forces acting on the aircraft and an unbalancing of the pitching moments, causing the nose of the aircraft to either move up or down.

Suppose the aircraft is in trim and is disturbed by a gust in a manner causing a change in airspeed. If this change in airspeed produces a nose-up or nose-down moment, tending to move the aircraft even further from its trimmed airspeed, the aircraft is deemed to at that time be longitudinally unstable.

Another measure of an airplane's longitudinal stability is termed the phugoid characteristics. An aircraft flying at a nearly constant angle of attack may tend to oscillate a slight amount in the vertical direction. The extent is termed the phugoid characteristic of the aircraft. During flight in the phugoid mode the pitch angle and altitude change in a manner maintaining a nearly constant angle of attack. Beginning at the top of a cycle, the aircraft slows down to its minimum airspeed and its pitch attitude is nose-up. It then begins to lose altitude. As it does so, its airspeed increases, followed by a nose-down attitude. At the bottom of the cycle its airspeed is a maximum and its attitude is nose-down. It then begins to climb. The airspeed begins to drop off, followed by a nose-up attitude, and then the cycle is repeated. If after perturbation these pitch attitude variations tend to diminish with time without pilot input, the aircraft is said to have stable phugoid characteristics.

The Boeing 757 aircraft includes instrumentation which changes stabilizer angle of attack as function of a change in airspeed, for augmenting longitudinal static stability of the aircraft. A problem with that particular system is that in some aircraft it destabilizes the aircraft's phugoid characteristics.

A principal object of the present invention is to provide a unique system and method for augmenting longitudinal stability by inputting an incremental horizontal stabilizer value that is a function of the change in airspeed from trim in a way that benefits both static longitudinal and phugoid stability.

DISCLOSURE OF THE INVENTION

The system and method of the present invention involve the control of the actuator which establishes the angle of attack of the horizontal stabilizer of an aircraft. The system is an add on to the pilot control and it functions following pilot movement of the stabilizer into a trim condition by automatically controlling stabilizer angle of attack to maintain trim.

In accordance with an aspect of the invention, any change in the rate of vertical movement of the aircraft from a reference rate at trim is detected and is used to produce a command signal input for stabilizer movement in a direction to trim out pitching moment changes.

In accordance with an aspect of the invention, the system includes a first measuring and computing means for measuring a change in airspeed from an initial airspeed existing at the completion of pilot movement of the stabilizer to establish trim and using such change in airspeed to produce a first command signal input for changing the stabilizer angle in an amount and direction sufficient to return the aircraft to trim. The system includes a second measuring and computing means for measuring a change in the rate of vertical movement of the aircraft from an initial rate existing at the completion of pilot movement of the stabilizer to establish trim, and using such change in rate of vertical movement to produce a second command signal input for changing the stabilizer angle in an amount and direction sufficient to return the aircraft to trim.

In preferred form, the system includes a feedback path that determines the relative change in the stabilizer angle of attack from a reference value. Such system includes means for algebraically summing the first and second command signal inputs and the feedback input into a command signal which is used for controlling the actuator for the stabilizer to cause a change in the stabilizer angle of attack towards trim.

In accordance with yet another aspect of the invention, the system includes means for rendering the command signal inactive to control the actuator for the stabilizer when engine power is below a predetermined level.

In accordance with another aspect of the invention, the system includes a means for rendering the command signal inactive to control the actuator for the stabilizer whenever the stabilizer position is within a range of positions below a predetermined stabilizer angle.

BEST MODE FOR CARRYING OUT THE INVENTION

Figure 1:
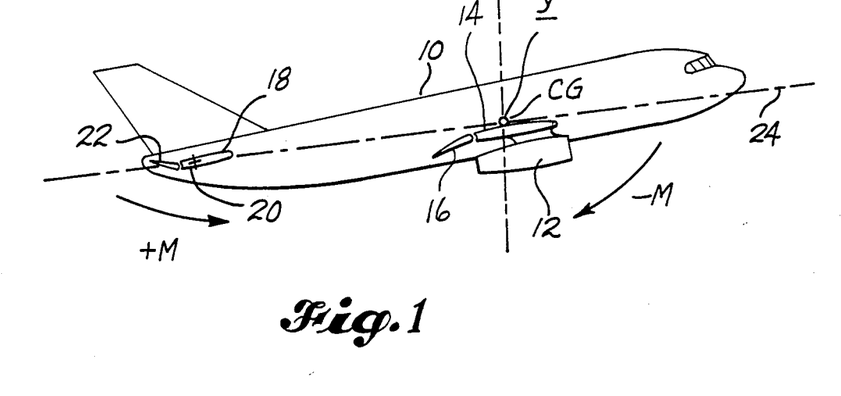
FIG. 1 is a side elevational view of an aircraft in a slight climb, showing plus and minus pitching moment vectors and the center of gravity of aircraft.

FIG. 1 shows the profile of a jet aircraft 10 of a type having underslung engines 12 (i.e. engines located below the wings 14).

In FIG. 1, the center of gravity of the aircraft is labeled "CG". The flaps 16 at the trailing edges of the wing 14 are shown in a down position and the aircraft 10 is in a climb. A nose-down moment vector $-M$ is shown forwardly of the center of gravity CG. A balancing nose-up moment vector $+M$ is shown in the tail region of the aircraft 10. This moment input $+M$ is produced by the horizontal stabilizer 18. The main body of the stabilizer 18 is mounted for rotation about a transverse axis 20. The stabilizer 18 carries elevators 22 at its trailing edges which are mounted on the stabilizer for up and down pivotal movement relative to the main body of the stabilizer 18.

Figures 2, 4:
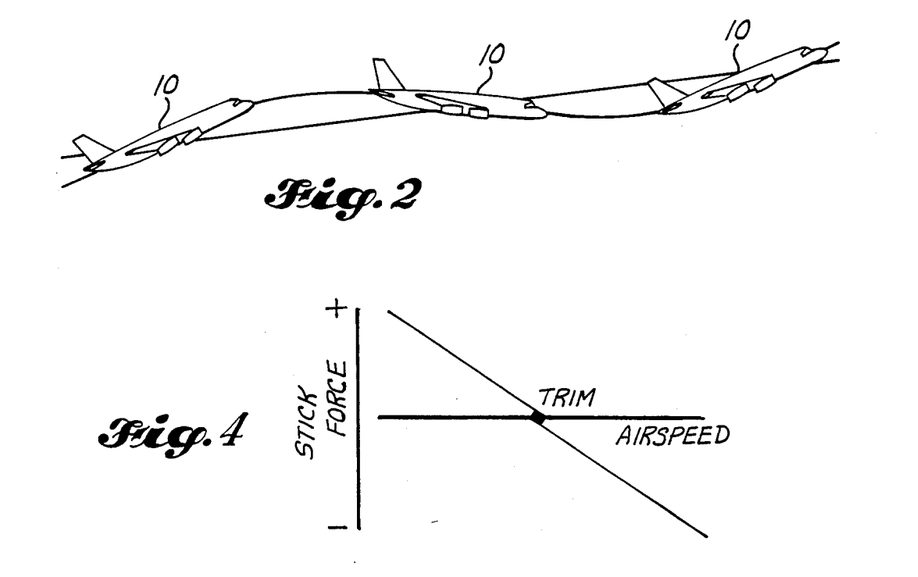
FIG. 2 is a smaller scale side elevational view of the aircraft showing the phugoid flight path with an exaggerated amplitude for clarity of illustration.
FIG. 4 is a stick force versus airspeed graph showing the stick force gradient which the present invention seeks to maintain.

FIG. 1 shows the aircraft 10 climbing along what is pictured to be a straight line path 24. FIG. 2 shows the aircraft 10 traveling an exaggerated phugoid flight path.

Figure 3:
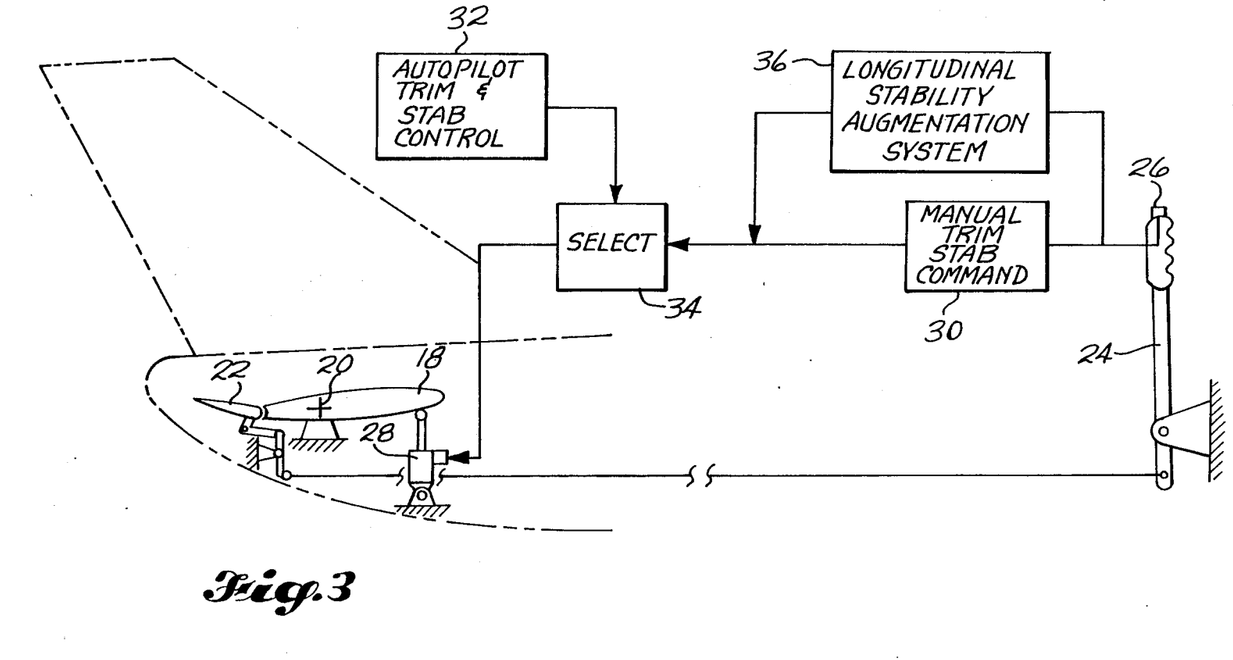
FIG. 3 is a schematic diagram of instrumentation used for controlling the actuator which changes the angle of the stabilizer.

During flight, the elevators are moved to provide transient pitch control. As schematically shown by FIG. 3, when the aircraft is under control of a pilot, the elevator 22 movement is caused by a front or rear pivotal movement of a steering column or "stick" 24. Once the pilot has determined a desirable flight path he depresses a button 26 and this causes the sending of a flight control signal to an actuator 28 that is connected to the main body of the stabilizer 18. This causes the actuator 28 to pivot the stabilizer 18 about the axis 20 in a direction and extent necessary to remove the stick force from the control stick 24. When the stick force is zero, the pilot can remove his hands from the column or stick 24 and the aircraft should remain in trim.

In terms of "stick force", an aircraft possesses static longitudinal stability if the condition of the elevators 22 is such that the pilot can input either a nose-down (negative) or nose-up (positive) stick force which will result in an increase or a decrease in airspeed, respectively. This required stick force gradient is shown in FIG. 4 of the drawing.

In order to assure this minimum stick force gradient, the system and method of the present invention inputs an incremental horizontal stabilizer value, as a function of the change in airspeed and rate of climb from trim, in a direction opposite to the input by the pilot. This provides static longitudinal stability.

In FIG. 3, the stabilizer positioning actuator 28 is shown to be controlled by either a pilot input 30 or an autopilot input 32. Block 34, labeled "select", is included merely to indicate that when the pilot control 30 is in use, the autopilot 32 is off, and vice versa. FIG. 3 also shows that the longitudinal static stability augmentation system 36 is only effective during piloted control when stabilizer motion is not being commanded.

The longitudinal stability augmentation system 36 functions to input an increment of horizontal stabilizer angle during times when the pilot is flying the aircraft but is not controlling the stabilizer angle. The system 36 detects movements away from trim and functions to automatically adjust the stabilizer angle to return the aircraft to trim. As will hereinafter be described in some detail, the system 36 employs reference levels of airspeed and rate of change of altitude which are determined by pilot movement of the stabilizer control button 26. As long as the pilot is inputting a change in stabilizer angle (i.e. depressing button 26), no differences exist on which the system 36 can operate. However, as soon as the pilot has input enough stabilizer movement in order to remove the "stick force" load produced by the elevators 22, and ceases his control of the stabilizer position, the airspeed, and rate of change of altitude, and stabilizer position existing at that time become reference values which are then used by the system 36.

The actuator 28 is connected between a frame portion of the aircraft 10 and a portion of the horizontal stabilizer spaced forwardly of the pivotal axis 20. FIG. 3 includes a schematic showing of the elevator control system.

Figure 5:
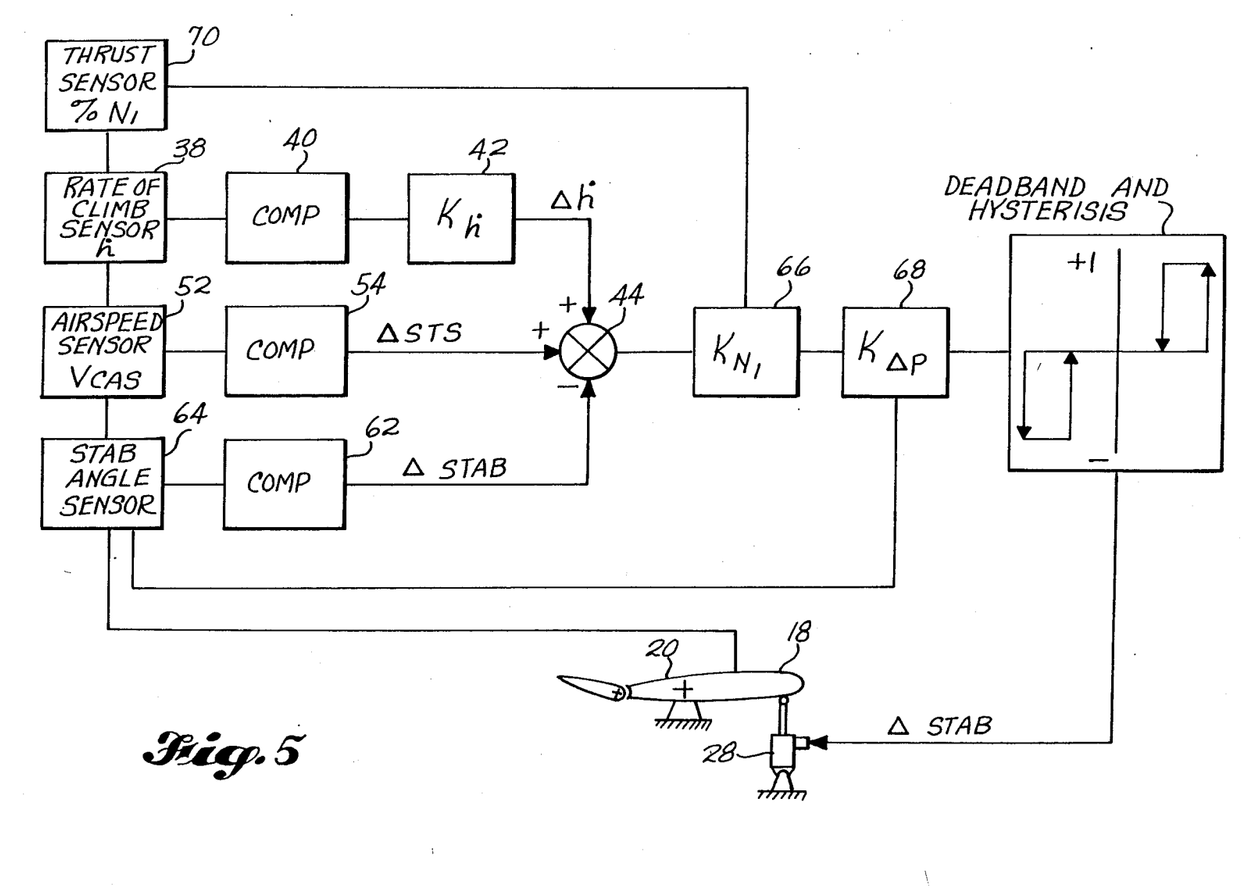
FIG. 5 is a basic block diagram of the longitudinal stability augmentation system of the present invention.

Referring to FIG. 5, the system 36 obtains inputs from four sensors. A first sensor 38 measures the rate of change of altitude of the aircraft 10. This part of the system includes a software schedule 40 for comparing a sensed rate of change of altitude with the rate of change of altitude existing at the time the pilot last stopped inputting a change in stabilizer angle. The schedule 40 produces an output signal which is adjusted by a gain control 42 to provide a command signal input in the form of an increment of actuator movement. This signal is delivered to a summing junction or mixer 44.

Referring to FIG. 3, let it be assumed that the pilot pulls on the control stick 28 to raise the elevator 22. In most cases, this would cause the aircraft 10 to slow down. The system 36 would detect this change in airspeed and adjust the stabilizer 18 in position to produce a change in pitching moment opposite to the pitching moment change created by pilot movement of the elevator 22. This results in the pilot having to continue to apply a stick force in order to perform the nose-up maneuver.

Figure 6:
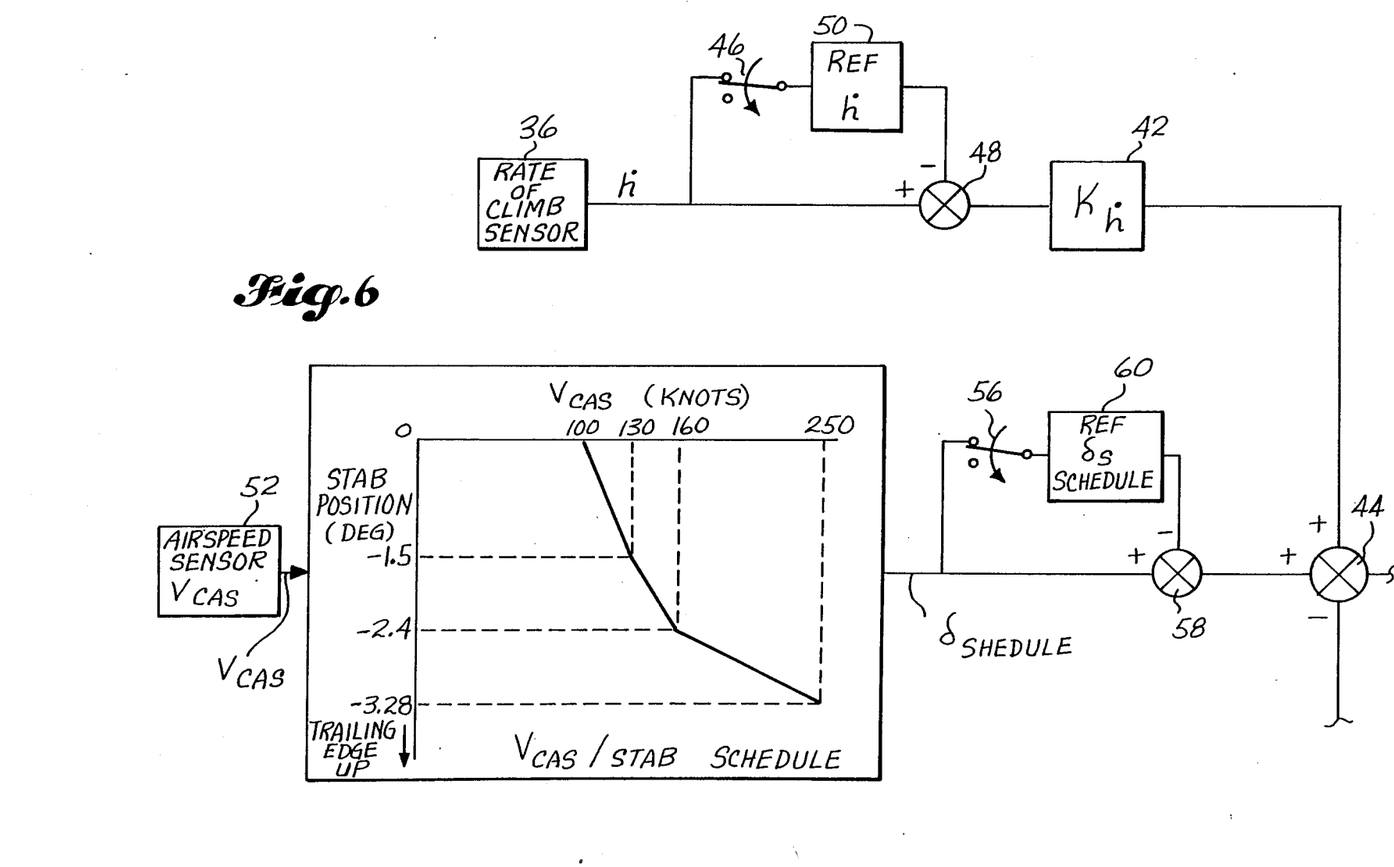
FIG. 6 is a schematic diagram of the change in altitude and change in airspeed portions of the system.

Referring to FIG. 6, when the stabilizer angle control button 26 is depressed the path 46 is closed and mixer 48 registers no change. However, when the button 26 is released, the path 46 is opened and the rate of altitude change existing at that time becomes a reference value 50. While path 46 is open, the mixer 48 compares the rate of altitude change signal coming from the sensor 38 with the reference value 50 and computes a command input based on the difference or change in the rate of altitude change.

The system further includes an airspeed sensor 52 which may deliver a calibrated airspeed measurement in knots to a schedule 54 (see FIG. 6) which in effect plots the speed value on a speed versus stabilizer angle graph and compares the stabilizer angle value so determined with the stabilizer angle value determined by a plot of the reference or trim airspeed on the same graph. The difference between the two values constitutes an adjustment signal to the mixer 44. While control button 26 is depressed to cause a change in stabilizer angle the path 56 is closed and no change is detected at mixer 58. When button 26 is released, path 56 opens and the stabilizer schedule value existing at that time becomes a reference value 60 which is compared by the mixer 58 with any new stabilizer schedule value from the computer.

The purpose of the gain adjustment 42 is to put the signal from the schedule 40 on the same scale as the output from schedule 54. In other words, the change in the rate of change of altitude from trim, and the change in airspeed from trim, both send a command signal to the mixer 44 which is in terms of increments of movement of the actuator 28.

Figure 7:
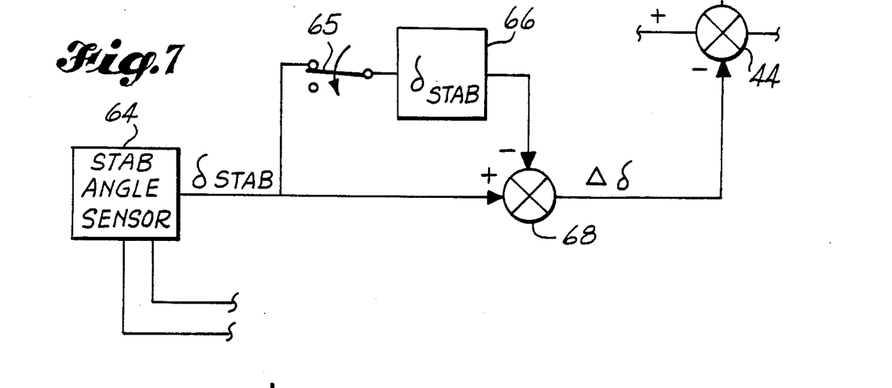
FIG. 7 is a schematic diagram of the stabilizer angle feedback portion of the system.

A feedback path is provided as shown in FIGS. 5 and 7. A computer 62 receives a signal from a sensor 64 which measures the actual angle of the stabilizer 18. The computer 62 compares the actual stabilizer angle with the actual stabilizer angle at trim and if there is a difference sends an adjusting error signal to the mixer 44.

Referring to FIG. 7, the control button 26 also controls a gate 65 that is closed when control button 26 is depressed. When the pilot releases button 26, path 64 opens and the stabilizer angle existing at that time becomes a reference value 66 which is an input to a mixer 68. This reference value 66 is compared with the actual stabilizer angle measurement to produce a command input to the mixer 44.

In some aircraft, the predicted flight characteristics indicate that for the aircraft to be longitudinally statically stable the system 36 must be outputting signals to the stabilizer actuator 28 only during the high thrust, aft center of gravity region of the flight envelope.

The inputs to the mixer 44 are always functioning during those periods of time that the aircraft is under pilot control and the pilot is not inputting a change in angle signal to the stabilizer 18. However, for such aircraft, the output from the mixer is transmitted onto the actuator 28 only during those conditions of flight in which the system is needed.

In order to so limit operation of the system 36, the system 36 includes a thrust level cutoff schedule 66 and a stabilizer angle cutoff schedule 68. The thrust level cutoff schedule 66 is directly controlled by the thrust level of the engines, sensed by a sensor 70, as shown in FIGS. 5 and 8.

The stabilizer position cutoff schedule 66 associates trim stabilizer position with aircraft center of gravity. When this schedule indicates an aft center of gravity condition (in terms of a certain range of stabilizer positions), the schedule 66 will allow transmission of a command signal to the actuator 28.

Figure 8:
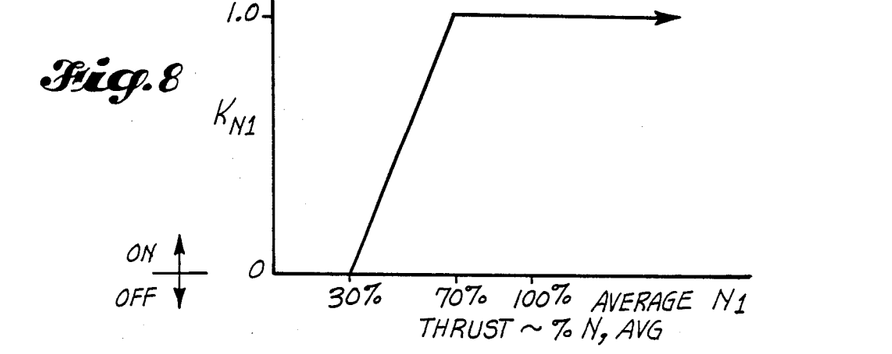
FIG. 8 is a graph indicating the thrust range in which the system of the invention is operable.

FIG. 8 shows in graph form the function of the cutoff schedule 66. Whenever the thrust level is above the horizontal axis, the system is on. The system is off when the thrust level is below this axis. In the example shown by FIG. 8, the system is off when the average thrust falls below about 30%.

Figure 9:
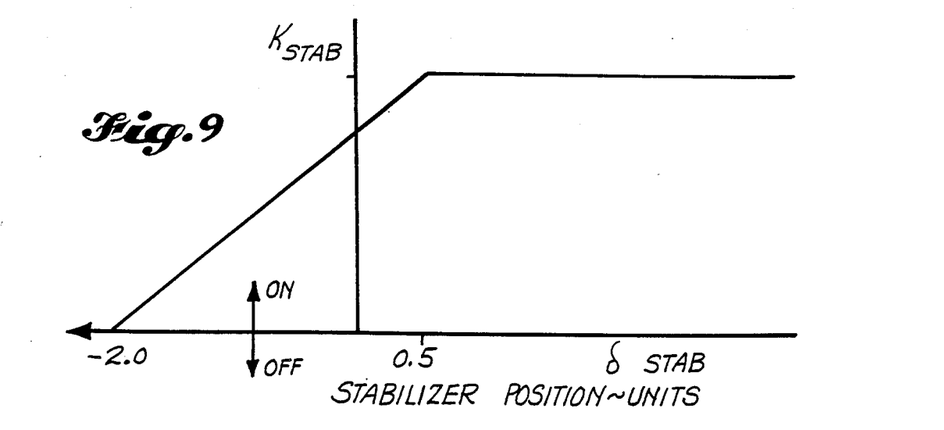
FIG. 9 is a graph showing the stabilizer positions in which the system is operable.

FIG. 9 graphically shows the function of cutoff schedule 68. Whenever the stabilizer position 18 is below the horizontal axis of the graph, the system is off.

As is well-known, center of gravity position changes occur in response to fuel consumption, the shifting of fuel during a climb or a descent, and changes of position of people in the aircraft. There is an established relationship between stabilizer angle and the position of the center of gravity of the aircraft. This provides a convenient way of measuring the position of the center of gravity of the aircraft.

The system also includes a dead band and hysteresis schedule 70. The output of the schedule 70 is the net command signal to the actuator 28 and it is in the form of a command to the actuator to move either in the up or down direction.

The incorporation into the system of the rate of change in altitude path enables the system to recognize an impending change in the direction of a change in speed and use this recognition to change the direction of stabilizer movement. In other words, a change in altitude rate occurs and can be detected and processed to a usable signal before a change of speed can be detected and processed into a usable signal. This incorporation of the change in altitude path into the system results in increased phugoid stability. An added benefit of the change in altitude path is its ability to command a stabilizer angle change input for trimming out pitching moment changes created as a result in engine thrust.

What is claimed is:

1. In an aircraft having a body including a tail section with a horizontal stabilizer mounted for rotation in position about a transverse axis, actuator means connected between the body and the stabilizer for rotating the stabilizer in position for changing the stabilizer angle of attack, and pilot controlled means for rotating the stabilizer in position to trim the aircraft, control means operable following pilot movement of the stabilizer into a trim condition for automatically controlling stabilizer angle of attack to maintain trim, comprising:
   first measuring and computing means for measuring a change in airspeed from an initial airspeed existing at the completion of pilot movement of the stabilizer to establish trim, and using such change in airspeed to produce a first command signal input for changing the stabilizer angle in an amount and direction sufficient to return the aircraft to trim;
   second measuring and computing means for measuring a change in rate of vertical movement of the aircraft from an initial rate existing at the completion of pilot movement of the stabilizer to establish trim, and using such change in rate of vertical movement to produce a second command signal input for changing the stabilizer angle in an amount and direction sufficient to return the aircraft to trim;
   third measuring and computing means for measuring the actual stabilizer angle of attack and comparing it with the stabilizer angle of attack existing at the completion of pilot movement of the stabilizer to trim and producing a stabilizer position command signal input;
   means for algebraically summing the first, second and third command signal inputs into a command signal;
   means responsive to said command signal for controlling the actuator means to cause a change in the stabilizer angle of attack towards trim; and
   said control means further comprising means rendering the command signal inactive to control the actuator means when engine power is below a predetermined level.

2. Control means according to claim 1, further comprising means rendering the command signal inactive to control the actuator means whenever the stabilizer position is within a predetermined range of stabilizer angle positions indicative that the center of gravity of the aircraft is in a range of positions in which the aircraft is longitudinally stable.

3. In an aircraft having a body including a tail section with a horizontal stabilizer mounted for rotation in position about a transverse axis, actuator means connected between the body and the stabilizer for rotating the stabilizer in position for changing the stabilizer angle of attack, and pilot controlled means for rotating the stabilizer in position to trim the aircraft, control means operable following pilot movement of the stabilizer into a trim condition for automatically controlling stabilizer angle of attack to maintain trim, comprising:

first measuring and computing means for measuring a change in airspeed from an initial airspeed existing at the completion of pilot movement of the stabilizer to establish trim, and using such change in airspeed to produce a first command signal input for changing the stabilizer angle in an amount and direction sufficient to return the aircraft to trim;

second measuring and computing means for measuring a change in rate of vertical movement of the aircraft from an initial rate existing at the completion of pilot movement of the stabilizer to establish trim, and using such change in rate of vertical movement to produce a second command signal input for changing the stabilizer angle in an amount and direction sufficient to return the aircraft to trim;

third measuring and computing means for measuring the actual stabilizer angle of attack and comparing it with the stabilizer angle of attack existing at the completion of pilot movement of the stabilizer to trim and producing a stabilizer position command signal input;

means for algebraically summing the first, second and third command signal inputs into a command signal;

means responsive to said command signal for controlling the actuator means to cause a change in the stabilizer angle of attack towards trim; and said control means further comprising means rendering the command signal inactive to control the actuator means whenever the stabilizer position is within a predetermined range of stabilizer angle positions indicative that the center of gravity of the aircraft is in a range of positions in which the aircraft is longitudinally stable.

4. A method of providing longitudinal stability in an aircraft having a body including a tail section with a horizontal stabilizer mounted for rotation in position about a transverse axis, and actuator means connected between the body and the stabilizer for rotating the stabilizer in position for changing the stabilizer angle of attack, said method comprising:

sensing a change in airspeed from an initial airspeed existing during a trim condition and computing from this change in airspeed a first command signal input to the actuator means, instructing it to change the angle of attack of the stabilizer in a direction and an amount sufficient to return the aircraft to a trim condition;

at the same time measuring the change in rate of vertical movement of the aircraft from a reference rate of vertical movement existing during the trim condition and using the change in rate of vertical movement to compute a second command signal input for directing the actuator means to change the stabilizer angle in an amount and direction sufficient to return the aircraft to the trim condition;

at the same time sensing the actual stabilizer angle of attack and comparing it to the angle of attack existing during the trim condition and computing from this comparison a third command signal input to the actuator means, instructing it to change the angle of attack of the stabilizer in a direction and an amount sufficient to return the aircraft to a trim condition;

algebraically summing the first, second and third command signal inputs to produce a command signal for the actuator means, directing it to make a change in the stabilizer angle of attack in a direction and amount sufficient to retrim the aircraft; and rendering the command signal inactive to control the actuator means when the engine power is below a predetermined level.

5. A method according to claim 4, further comprising rendering the command signal inactive to control the actuator means whenever the stabilizer position is within a range of stabilizer angle positions indicative that the center of gravity is within a range in which the aircraft is longitudinally stable.

6. A method of providing longitudinal stability in an aircraft having a body including a tail section with a horizontal stabilizer mounted for rotation in position about a transverse axis, and actuator means connected between the body and the stabilizer for rotating the stabilizer in position for changing the stabilizer angle of attack, said method comprising:

sensing a change in airspeed from an initial airspeed existing during a trim condition and computing from this change in airspeed a first command signal input to the actuator means, instructing it to change the angle of attack of the stabilizer in a direction and an amount sufficient to return the aircraft to a trim condition;

at the same time measuring the change in rate of vertical movement of the aircraft from a reference rate of vertical movement existing during the trim condition and using the change in rate of vertical movement to compute a second command signal input for directing the actuator means to change the stabilizer angle in an amount and direction sufficient to return the aircraft to the trim condition;

at the same time sensing the actual stabilizer angle of attack and comparing it to the angle of attack existing during the trim condition and computing from this comparison a third command signal input to the actuator means, instructing it to change the angle of attack of the stabilizer in a direction and an amount sufficient to return the aircraft to a trim condition;

algebraically summing the first, second and third command signal inputs to produce a command signal for the actuator means, directing it to make a change in the stabilizer angle of attack in a direction and amount sufficient to retrim the aircraft; and rendering the command signal inactive to control the actuator means whenever the stabilizer position is within a range of stabilizer angle positions indicative that the center of gravity of the aircraft is within a range of positions in which the aircraft is longitudinally stable.

7. In an aircraft having a body including a tail section with a horizontal stabilizer mounted for rotation in position about a first transverse axis, an elevator mounted onto the stabilizer for rotation in position about a second transverse axis, actuator means connected between the body and the stabilizer for rotating the stabilizer in position for changing the stabilizer angle of attack, pilot controlled means for rotating the elevator in position to input a pitching moment change to the aircraft, pilot controlled means for rotating the stabilizer in position to trim the aircraft, said pilot controlled means for rotating the elevator being controllable independently of said pilot controlled means for rotating the stabilizer, and control means operable following pilot movement of the stabilizer into a trim condition for automatically controlling stabilizer angle of attack to maintain trim, said control means being inoperable to change the stabilizer angle of attack while the pilot is operating the pilot controlled means for trimming the aircraft, but operable during other periods of pilot controlled flight, including when the pilot is moving the elevator, said control means including means for measuring a change in rate of vertical movement of the aircraft from a reference rate at trim and using such change in rate of vertical movement to produce a command signal input for moving the stabilizer in a direction an amount for trimming out pitching moment changes.

8. Control means according to claim 7, further comprising measuring and computing means for measuring a change in airspeed from an initial airspeed existing at the completion of pilot movement of the stabilizer to establish trim, and using such change in airspeed to produce a command signal input for changing the stabilizer angle in an amount and direction sufficient to return the aircraft to trim.

9. Control means according to claim 8, further comprising measuring and computing means for measuring the actual angular position of the stabilizer and comparing it with the angular position of the stabilizer existing at the completion of pilot movement of the stabilizer to establish trim, and developing from any difference in angular position of the stabilizer a command signal input for changing the stabilizer angle in an amount and direction sufficient to return the aircraft to trim.

10. Control means according to claim 9, wherein the change in rate of vertical movement command input, the change in airspeed command input and the change in stabilizer angle of attack input are combined to produce a single command signal.

11. In an aircraft having a body including a tail section with a horizontal stabilizer mounted for rotation in position about a first transverse axis, an elevator mounted onto the stabilizer for rotation in position about a second transverse axis, actuator means connected between the body and the stabilizer for rotating the stabilizer in position for changing the stabilizer angle of attack, pilot controlled means for rotating the elevator in position to input a pitching moment change to the aircraft, pilot controlled means for rotating the stabilizer in position to trim the aircraft, and control means operable following pilot movement of the stabilizer into a trim condition for automatically controlling stabilizer angle of attack to maintain trim, said control means being inoperable to change the stabilizer angle of attack while the pilot is operating the pilot controlled means for trimming the aircraft, but operable during other periods of pilot controlled flight, including when the pilot is moving the elevator, said control means including means for measuring a change in rate of vertical movement of the aircraft from a reference rate at trim and using such change in rate of vertical movement to produce a command signal input for moving the stabilizer in a direction an amount for trimming out pitching moment changes, said control means further including means for rendering the command signal inactive to control the actuator means for the stabilizer when the engine thrust is below a predetermined level indicative that the aircraft is longitudinally stable.

12. In an aircraft having a body including a tail section with a horizontal stabilizer mounted for rotation in position about a first transverse axis, an elevator mounted onto the stabilizer for rotation in position about a second transverse axis, actuator means connected between the body and the stabilizer for rotating the stabilizer in position for changing the stabilizer angle of attack, pilot controlled means for rotating the elevator in position to input a pitching moment change to the aircraft, pilot controlled means for rotating the stabilizer in position to trim the aircraft, and control means operable following pilot movement of the stabilizer into a trim condition for automatically controlling stabilizer angle of attack to maintain trim, said control means being inoperable to change the stabilizer angle of attack while the pilot is operating the pilot controlled means for trimming the aircraft, but operable during other periods of pilot controlled flight, including when the pilot is moving the elevator, said control means including means for measuring a change in rate of vertical movement of the aircraft from a reference rate at trim and using such change in rate of vertical movement to produce a command signal input for moving the stabilizer in a direction an amount for trimming out pitching moment changes, said control means further including measuring and computing means for measuring a change in airspeed from an initial airspeed existing at the completion of pilot movement of the stabilizer to establish trim, and using such change in airspeed to produce a command signal input for changing the stabilizer angle in an amount and direction sufficient to return the aircraft to trim, and still further, said control means including means for rendering the command signal inactive to control the actuator means for the stabilizer when the engine thrust is below a predetermined level indicative that the aircraft is longitudinally stable.

13. In an aircraft having a body including a tail section with a horizontal stabilizer mounted for rotation in position about a first transverse axis, an elevator mounted onto the stabilizer for rotation in position about a second transverse axis, actuator means connected between the body and the stabilizer for rotating the stabilizer in position for changing the stabilizer angle of attack, pilot controlled means for rotating the elevator in position to input a pitching moment change to the aircraft, pilot controlled means for rotating the stabilizer in position to trim the aircraft, and control means operable following pilot movement of the stabilizer into a trim condition for automatically controlling stabilizer angle of attack to maintain trim, said control means being inoperable to change the stabilizer angle of attack while the pilot is operating the pilot controlled means for trimming the aircraft, but operable during other periods of pilot controlled flight, including when the pilot is moving the elevator, said control means including means for measuring a change in rate of vertical movement of the aircraft from a reference rate at trim and using such change in rate of vertical movement to produce a command signal input for moving the stabilizer in a direction an amount for trimming out pitching moment changes, said control means further including measuring and computing means for measuring a change in airspeed from an initial airspeed existing at the completion of pilot movement of the stabilizer to establish trim, and using such change in airspeed to produce a command signal input for changing the stabilizer angle in an amount and direction sufficient to return the aircraft to trim, said control means further including measuring and computing means for measuring the actual angular position of the stabilizer and comparing it with the angular position of the stabilizer existing at the completion of pilot movement of the stabilizer to establish trim, and developing from any difference in angular position of the stabilizer a command signal input for changing the stabilizer angle in an amount and direction sufficient to return the aircraft to trim, and still further, said control means including means for rendering the command signal inactive to control the actuator means for the stabilizer when the engine thrust is below a predetermined level indicative that the aircraft is longitudinally stable.

14. In an aircraft having a body including a tail section with a horizontal stabilizer mounted for rotation in position about a first transverse axis, an elevator mounted onto the stabilizer for rotation in position about a second transverse axis, actuator means connected between the body and the stabilizer for rotating the stabilizer in position for changing the stabilizer angle of attack, pilot controlled means for rotating the elevator in position to input a pitching moment change to the aircraft, pilot controlled means for rotating the stabilizer in position to trim the aircraft, and control means operable following pilot movement of the stabilizer into a trim condition for automatically controlling stabilizer angle of attack to maintain trim, said control means being inoperable to change the stabilizer angle of attack while the pilot is operating the pilot controlled means for trimming the aircraft, but operable during other periods of pilot controlled flight, including when the pilot is moving the elevator, said control means including means for measuring a change in rate of vertical movement of the aircraft from a reference rate at trim and using such change in rate of vertical movement to produce a command signal input for moving the stabilizer in a direction an amount for trimming out pitching moment changes, said control means further including measuring and computing means for measuring a change in airspeed from an initial airspeed existing at the completion of pilot movement of the stabilizer to establish trim, and using such change in airspeed to produce a command signal input for changing the stabilizer angle in an amount and direction sufficient to return the aircraft to trim, said control means still further including measuring and computing means for measuring the actual angular position of the stabilizer and comparing it with the angular position of the stabilizer existing at the completion of pilot movement of the stabilizer to establish trim, and developing from any difference in angular position of the stabilizer a command signal input for changing the stabilizer angle in an amount and direction sufficient to return the aircraft to trim, and wherein the change in rate of vertical movement command input, the change in airspeed command input and the change in stabilizer angle of attack input are combined to produce a single command signal, and still further, said control means including means for rendering the command signal inactive to control the actuator means for the stabilizer when the engine thrust is below a predetermined level indicative that the aircraft is longitudinally stable.

15. Control means according to claim 11, further comprising means rendering the command signal inactive to control the actuator means for the stabilizer whenever the stabilizer angle is within a predetermined stabilizer angle range indicative that the center of the gravity of the aircraft is within a range in which the aircraft is longitudinally stable.

16. Control means according to claim 12, further comprising means rendering the command signal inactive to control the actuator means for the stabilizer whenever the stabilizer angle is within a predetermined stabilizer angle range indicative that the center of the gravity of the aircraft is within a range in which the aircraft is longitudinally stable.

17. Control means according to claim 13, further comprising means rendering the command signal inactive to control the actuator means for the stabilizer whenever the stabilizer angle is within a predetermined stabilizer angle range indicative that the center of the gravity of the aircraft is within a range in which the aircraft is longitudinally stable.

18. Control means according to claim 14, further comprising means rendering the command signal inactive to control the actuator means for the stabilizer whenever the stabilizer angle is within a predetermined stabilizer angle range indicative that the center of the gravity of the aircraft is within a range in which the aircraft is longitudinally stable.

* * * * *